(12) United States Patent
Abdoh

(10) Patent No.: US 6,564,207 B1
(45) Date of Patent: May 13, 2003

(54) METHOD FOR AUTOMATED DATA COLLECTION, ANALYSIS AND REPORTING

(76) Inventor: Ahmed A. Abdoh, 42 Farmingdale Blvd., Winnipeg, Manitoba (CA), R3P 2G1

( * ) Notice: Subject to any disclaimer, the term of this patent is extended or adjusted under 35 U.S.C. 154(b) by 0 days.

(21) Appl. No.: 09/429,493

(22) Filed: Oct. 29, 1999

Related U.S. Application Data

(60) Provisional application No. 60/106,622, filed on Nov. 2, 1998.

(51) Int. Cl.[7] .............................................. G06F 17/30
(52) U.S. Cl. ............................... 707/3; 707/10; 707/102
(58) Field of Search ........................ 707/3, 6, 7, 102, 707/100, 101, 10; 705/14, 15, 16, 27, 10, 26; 455/186.1; 434/362, 322; 704/235

(56) References Cited

U.S. PATENT DOCUMENTS

| | | | | |
|---|---|---|---|---|
| 5,884,302 A | * | 3/1999 | Ho ................................. | 707/3 |
| 5,890,139 A | * | 3/1999 | Suzuki et al. .................. | 705/27 |
| 5,893,075 A | * | 4/1999 | Plainfield et al. ............. | 705/14 |
| 5,893,098 A | * | 4/1999 | Peters et al. ................... | 707/10 |
| 6,093,026 A | * | 7/2000 | Walker et al. .............. | 434/322 |
| 6,161,090 A | * | 12/2000 | Kanevsky et al. .......... | 704/246 |

* cited by examiner

*Primary Examiner*—Sanjiv Shah
(74) *Attorney, Agent, or Firm*—Michael R. Williams; Adrian D. Battison; Ryan W. Dupuis

(57) ABSTRACT

A method of automated data collection, analysis and reporting is described. A plurality of questionnaires each consisting of a number of questions are stored in a database. New questionnaires may be added or existing ones modified by contacting the database by telephone. In use, a respondent accesses the database by telephone. Once the respondent is connected, the respondent enters a code which identifies the respondent and the questionnaire to be completed. The questions of the questionnaire are "read" to the respondent by an interactive voice response which then prompts the respondent to enter a response. The response is recorded and the next question is then "read". The process is continued until the questionnaire has been completed. The results are then immediately analyzed and reported to a third party. For example, the responses of the latest respondent may be compared to the responses of all previous respondents or previous responses of the same respondent. The report may be sent automatically, for example, by fax.

17 Claims, 4 Drawing Sheets

Patient Satisfaction

```
RESULTS OF TeleForms: PSQ-18*

SURVEY DATE: 07/31/1998      SURVEY TIME: 11:38:05

RESPONDENT ID #: 0000

SURVEY RECEPIENT: TeleForms Demo User    INSTITUTION:

RESPONDENT AGE: <25 years     RESPONDENT SEX: MALE
```

* Marshal GN, Hays RD. The Patient Satisfaction Questionnaire Short-Form (PSQ-18). Santa Monica, CA, USA: RAND, 1994.

| SCALE | RESPONDENT SURVEY VALUE | AVERAGE ON RECORD VALUE |
|---|---|---|
| General Satisfaction | : 50.00% | 56.67% |
| Technical Quality | : 56.25% | 56.67% |
| Interpersonal Manner | : 62.50% | 29.17% |
| Communication | : 62.50% | 50.00% |
| Financial Aspects | : 50.00% | 20.83% |
| Time Spent with Doctor | : 12.50% | 35.83% |
| Accessibility and Convenience | : 25.00% | 41.67% |

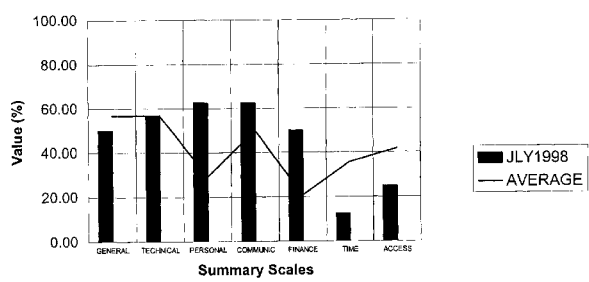

Patient Satisfaction Questionnaire (PSQ-18)

Figure 1

Patient Satisfaction

RESULTS OF TeleForms: PSQ-18*

SURVEY DATE: 07/31/1998      SURVEY TIME: 11:38:05

RESPONDENT ID #: 0000

SURVEY RECEPIENT: TeleForms Demo User     INSTITUTION:

RESPONDENT AGE: <25 years        RESPONDENT SEX: MALE

* Marshal GN, Hays RD. The Patient Satisfaction Questionnaire
  Short-Form (PSQ-18). Santa Monica, CA, USA: RAND, 1994.

```
                              RESPONDENT SURVEY      AVERAGE ON RECORD
SCALE                              VALUE                  VALUE

General Satisfaction          : 50.00%                   56.67%
Technical Quality             : 56.25%                   56.67%
Interpersonal Manner          : 62.50%                   29.17%
Communication                 : 62.50%                   50.00%
Financial Aspects             : 50.00%                   20.83%
Time Spent with Doctor        : 12.50%                   35.83%
Accessibility and Convenience : 25.00%                   41.67%
```

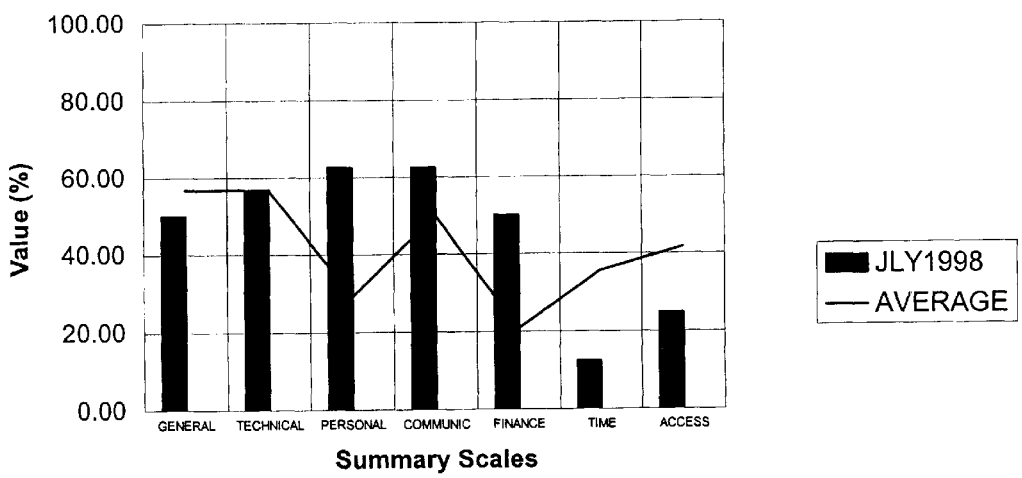

Patient Satisfaction Questionnaire (PSQ-18)

Figure 2

Functional Health

```
RESULTS OF TeleForms: SF-36*

SURVEY DATE: 07/31/1998        SURVEY TIME: 12:48:56

PATIENT ID #: 0000

ATTENDING PHYSICIAN: TeleForms Demo User      INSTITUTION:

PATIENT AGE: 25      PATIENT SEX: MALE

* Ware JE, Sherbourne CD. The MOS 36-item Short-Form Health Survey (SF-36)
  I. Conceptual framework and Item Selection. Medical Care 1992;30:473-83.
  Ware JE, Kosinski M, Keller SD. SF-36 Physical and Mental Health Summary
  Scales: A User's Manual. Boston, MA: The Health Institute, 1994.

MOST RECENT SURVEY
     SCALE                                            VALUE

SF-36 PHYSICAL FUNCTIONING (PF)                : 45.00%
     SF-36 SOCIAL FUNCTIONING (SF)                  : 62.50%
     SF-36 ROLE-PHYSICAL (RP)                       : 75.00%
     SF-36 ROLE-EMOTIONAL (RE)                      : 66.67%
     SF-36 MENTAL HEALTH INDEX (MH)                 : 48.00%
     SF-36 VITALITY (VT)                            : 60.00%
     SF-36 PAIN INDEX (BP)                          : 62.00%
     SF-36 GENERAL HEALTH PERCEPTIONS (GH)          : 60.00%
     SF-36 HEALTH TRANSITION ITEM (HT)              : 75.00%
     STANDARDIZED PHYSICAL COMPONENT SCALE (PCS)    : 42.90%
     STANDARDIZED MENTAL COMPONENT SCALE (MCS)      : 43.03%
```

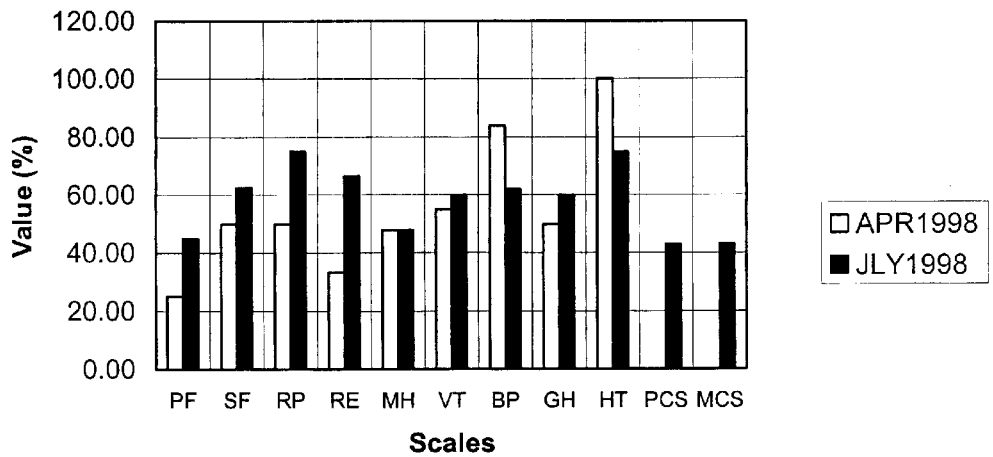

Figure 3

Functional Health

RESULTS OF TeleForms: SF-12*

SURVEY DATE: 07/31/1998          SURVEY TIME: 11:45:14

PATIENT ID #: 0000

ATTENDING PHYSICIAN: TeleForms Demo User     INSTITUTION:

PATIENT AGE: 34        PATIENT SEX: FEMALE

* Ware JE, Kosinski M, Keller SD. A 12-Item Short-Form Health Survey
  (SF-12): construction of Scales and preliminary tests of reliability
  and validity. Medical Care 1996;32:220-3

MOST RECENT SURVEY

SCALE                                        VALUE

PHYSICAL COMPONENT SUMMARY MEASURE (PCS): 42.54%
MENTAL COMPONENT SUMMARY MEASURE (MCS)  : 44.19%

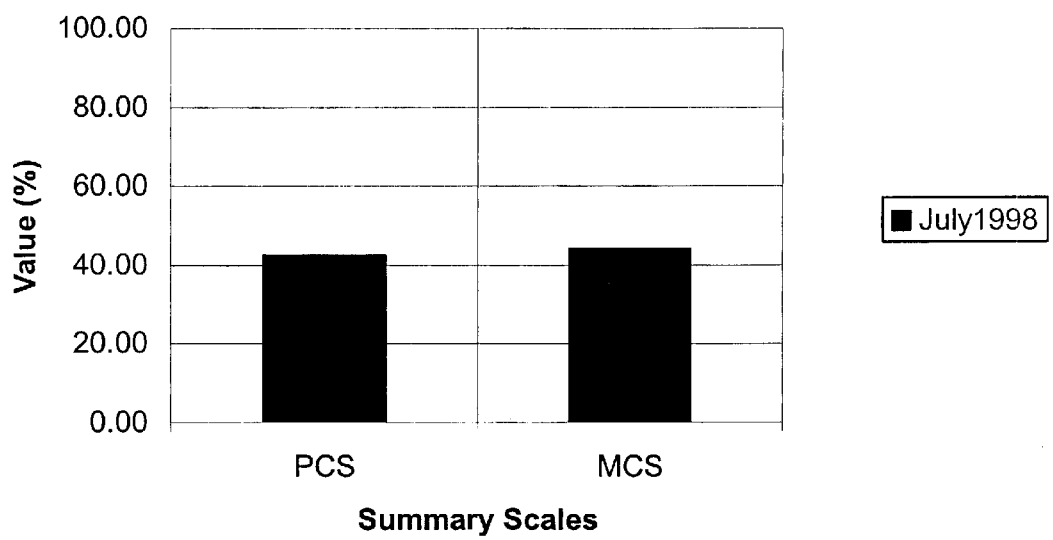

Figure 4

Comorbidity

RESULTS OF TeleForms: Comorbidity (CCI)*

SURVEY DATE: 07/31/1998     SURVEY TIME: 12:41:21

PATIENT ID #: 0000

PHYSICIAN: TeleForms Demo User     INSTITUTION:

PATIENT AGE: 25     PATIENT SEX: MALE

* Charlson ME, Pompei P, Ales K, MacKenzie C. A new method of classifying prognostic comorbidity in longitudinal studies: development and validation. J Chron Dis 1987:40:370-83.

COMORBIDITY SURVEY

| CONDITION | PRESENT |
|---|---|
| Myocardial Infarct | X |
| Congestive Heart Failure | |
| Peripheral Vascular Disease | X |
| Cerebrovascular Disease | |
| Dementia | X |
| Chronic Pulmonary Disease | |
| Connective Tissue Disease | X |
| Ulcer Disease | X |
| Mild Liver Disease | |
| Diabetes | X |
| Hemiplegia | |
| Moderate or Severe Renal Disease | X |
| Diabetes with End Organ Damage | |
| Any Tumor | X |
| Leukemia | |
| Lymphoma | X |
| Moderate or Severe Liver Disease | |
| Metastatic Solid Tumor | |
| Aids | X |
| Charlson Comorbidity Index (CCI) | 18 |

METHOD FOR AUTOMATED DATA COLLECTION, ANALYSIS AND REPORTING

This application claims benefit of Provisional No. 60/106,622 filed Nov. 2, 1998.

The present invention relates generally to the field of data collection and analysis and reporting. More specifically, the present invention relates to an automated method of collecting data in response to a plurality of questionnaires, analyzing them and reporting the results to a third party.

BACKGROUND OF THE INVENTION

Collection of statistical data can be prohibitively expensive. Specifically, a questionnaire must be prepared and distributed. The questionnaire must then be completed by the respondent and returned so that the results can be recorded and analyzed. Typically, questionnaires are mailed to potential respondents along with return postage; however, many questionnaires go unanswered, due to either forgetfulness or inconvenience. Furthermore, the returned questionnaires must be recorded manually and then analyzed, resulting in further costs. As a result, many small scale surveys that could provide useful information go undone. Finally, there is considerable lag time, as the questionnaires must be sent out, returned, recorded, analyzed and then reported, causing some to think that they are hardly worth the effort. Clearly, an automated method of data collection and analysis which would reduce costs and eliminate waiting is needed.

SUMMARY OF THE INVENTION

According to an aspect of the invention, there is provided a method for automated data collection, analysis and reporting comprising:

(a) providing a database containing a plurality of questionnaires, each questionnaire composed of a series of questions and each questionnaire associated with an identifier;

(b) providing a control unit connected to the database, said control unit including a computerized voice synthesizer;

(c) connecting the control unit to a respondent via a telephone line such that the control unit identifies the respondent and accesses from the questionnaires in the database a specific one questionnaire to be completed by the respondent from the database;

(d) generating a computerized voice via the voice synthesizer corresponding to a question from the questionnaire to be completed;

(e) prompting the respondent to enter a response to the question using a telephone keypad;

(f) recording the response entered; and (g) repeating steps (d)–(f) until all of the questions in the questionnaire to be completed have been answered.

The control unit may prompt the voice synthesizer to repeat the question if an invalid response is entered.

The control unit may be arranged to connect to more than one respondent at a time. In this manner, the database of questionnaires may be accessed by more than one respondent at a time.

The control unit may be connected to the respondent by the respondent calling the control unit.

The control unit may be connected to the respondent by the control unit calling the respondent. The control unit may include an automated dialer for calling respondents. In this manner, the control unit may be directed to call a number of potential respondents and ask them to complete the questionnaire. It is of note that this process is entirely automated.

Preferably, the method includes:

(h) reporting the responses of the respondent to a third party.

Alternatively, the method may include:

(h) analyzing the responses entered by the respondent; and (i) providing results of the analysis to a third party.

More preferably, the results are provided electronically. That is, the control unit, for example, faxes the results directly to a third party or posts the results on a web page that can be accessed by the third party. Furthermore, this process may be completely automated.

Preferably, the method includes:

(h) providing a second database containing responses of previous respondents; and (i) storing the responses of the respondent in the second database such that the responses are associated with said respondent.

More preferably, the method further includes:

(j) averaging the responses of the respondent and the previous respondents to each question; and (k) reporting to a third party.

The report may include the responses of the respondent and the averages.

The third party may be a health care provider and the questionnaire may be a medically-related questionnaire.

The respondent may be identified by the control unit by an identification number, said identification number identifying the respondent, the questionnaire to be completed and the third party to be reported to.

The method may include entering a questionnaire into the database by contacting the control unit and entering the questions and a range of responses by telephone.

One embodiment of the invention will now be described in conjunction with the accompanying drawings in which:

BRIEF DESCRIPTION OF THE DRAWINGS

FIG. 1 is a sample report of patient satisfaction generated using the method.

FIG. 2 is a sample report of functional health generated using the method.

FIG. 3 is a sample report of functional health generated using the method.

FIG. 4 is a sample report of comorbidity generated using the method.

DETAILED DESCRIPTION

Described herein is a novel method of data capture, analysis and reporting, employing advanced computer telephony integration technology. In the embodiment described below, the method is directed to health care, wherein a patient's demographic, clinical and health outcome information is captured, analyzed and reported. For example, the questionnaires could be used for patient satisfaction surveys, pre-visit data collection, post-visit treatment outcomes or pre-admission and post-hospital discharge surveillance and follow-up. As will be apparent, however, the method is flexible and versatile enough that data of virtually any type may be captured, as described below.

In this embodiment, there is provided a database and a control unit.

The database includes a plurality of questionnaires, each questionnaire consisting of a series of questions. Furthermore, each questionnaire is associated with an identification number, as described below. Questionnaires may be posted to the database by contacting the control unit via telephone and recording the questions as well as valid ranges for the responses specified. In some embodiments, questionnaire posting may require prior approval from the system administrator. It is of note that once a questionnaire is entered into the database, it is immediately available for use. As a result of this arrangement, the method described herein provides an affordable system for small scale surveys, as described below.

The control unit includes an interactive voice response unit and, in this embodiment, the control unit is arranged to accept incoming calls.

Specifically, in this embodiment, a respondent contacts the control unit by telephone. Once contact is established, the respondent enters an identification code using the telephone keypad. Furthermore, in some embodiments, the respondent may also enter a password to ensure that no errors have been made during entry of the identification code. It is of note that, in some embodiments, the respondent may be prompted to enter the identification code by the interactive voice response unit. In this embodiment, the identification code comprises a respondent code identifying the respondent and a questionnaire code corresponding to the identification number of the questionnaire to be completed. Thus, in this manner, the respondent informs the control unit of their identity, which questionnaire is to be completed and which institution to report to.

The control unit then accesses the questionnaire to be completed from the database based upon the questionnaire code entered. The interactive voice response unit then "reads" the questions of the questionnaire to be completed to the respondent one at a time. That is, the interactive voice response unit generates a signal corresponding to a question in the questionnaire to be completed, which the respondent hears over the telephone line. Once the question has been "read", the interactive voice response unit prompts the respondent to reply using the telephone keypad. Once the response is entered by the respondent, it is recorded by the control unit. If an invalid response has been entered, the question is repeated; otherwise, the response is stored and the next question is "read" to the respondent. This process continues until all of the questions of the questionnaire to be completed have been answered.

The captured data, that is, the responses, may be immediately analyzed and reported to a third party, as shown in FIGS. 1–4. Specifically, the captured data may be faxed directly to, for example, a physician, hospital or clinic. Alternatively, the data may be posted to a secure web page on the internet for remote access on demand by the third party, as described below. Furthermore, in case of emergent needs, clinical care providers could be paged for even faster responses. It is of note that the respondent may be identified solely by the respondent code or identification code or the respondent code and/or identification code may be matched up with the respondent's name when the responses are reported, according to user preference.

In a further embodiment, there is provided a second database in which the control unit stores the responses of the respondents such that the responses are associated with the respondent, for example, by identification code or respondent code such that the responses may be retrieved. Furthermore, the responses to specific questionnaires are grouped together in the database so that individual respondent responses to a particular questionnaire can be immediately reported with reference to the average responses on file or with reference to previous responses of the same respondent. The averages can be automatically updated subsequent to entry of each individual respondent's responses.

For example, in one embodiment, where patient satisfaction in a medical institution or groups of institutions is being monitored, patient satisfaction surveys could be analyzed for different aspects of satisfaction in real-time and displayed on a remote monitor connected to the above-described system and updated by each individual patient's responses.

Alternatively, reports could be accessed on the internet or created and faxed on demand by calling the control unit and entering a specific code.

In this embodiment, the control unit is arranged such that multiple respondents may be connected at one time. Specifically, in this embodiment, up to 64 telephone lines may respond through one telephone number to complete different questionnaires and/or perform different actions such as, for example, creating and updating new questionnaires. In this embodiment, the database is equipped to store up to 1,000 questionnaires, each questionnaire having an unlimited number of questions. Furthermore, there may be up to 10,000 respondents per questionnaire. As will be apparent to one knowledgeable in the art, other arrangements and combinations are possible and are within the scope of the present invention.

In other embodiments, the control unit includes an automated dialer such that the control unit can call respondents directly.

Thus, the above-described method eliminates the need for printing paper questionnaires, out-mailing and reply postage costs, data entry errors and costs, statistical analysis costs and, most importantly, the time lapse between mailing questionnaires and getting results analyzed and reports generated. Furthermore, as discussed above, the method described above is flexible enough that it can be easily customized to meet each and every need in patient satisfaction, functional health status assessment, patient-centered outcomes evaluation, pre-admission and post-discharge questionnaires and the like.

Data could also be fed into the database by healthcare providers via the telephone, for example, to update patients' clinical data, specifically vital data, where it could then be accessed by other authorized providers by telephone through special access numbers, thereby providing quickly and easily access to patients' electronic medical record without the need to have a computer in place, as the telephone keypad essentially replaces the keyboard and a fax machine replaces the printer.

As discussed above, the above-described method provides a versatile and flexible method of generating and storing multiple questionnaires and of collecting and analyzing responses to the questionnaires. The system is affordable enough to be used for small scale surveys yet powerful enough to retain a great deal of individual data, as discussed above. Furthermore, the data is available instantaneously on demand without lag time.

The advantages to, for example, health care providers are enormous in terms of having information gathered, analyzed and reported before the encounter with the patient is made. This saves much time and improves the quality of health care by focusing on the important issues rather than wasting time on gathering basic information from the patient during the encounter. For example, data could be gathered, analyzed and reported to the health care provider even while patients are sitting in the waiting room via a touch tone phone.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A method for automated data collection, analysis and reporting comprising:
   (a) providing a database containing a plurality of questionnaires, each questionnaire composed of a series of questions and each questionnaire associated with an identifier;
   (b) providing a control unit connected to the database, said control unit including a computerized voice synthesizer;
   (c) connecting the control unit to a respondent via a telephone line such that the control unit identifies the respondent and accesses from the questionnaires in the database a specific one questionnaire to be completed by the respondent from the database;
   (d) generating a computerized voice via the voice synthesizer corresponding to a question from the questionnaire to be completed;
   (e) prompting the respondent to enter a response to the question using a telephone keypad;
   (f) recording the response entered; and
   (g) repeating steps (d)–(f) until all of the questions in the questionnaire to be completed have been answered.

2. The method according to claim 1 wherein the control unit is arranged to connect to more than one respondent at a time.

3. The method according to claim 1 wherein the control unit is connected to the respondent by the respondent calling the control unit.

4. The method according to claim 1 wherein the control unit is connected to the respondent by the control unit calling the respondent.

5. The method according to claim 4 wherein the control unit includes an automated dialer for calling respondents.

6. The method according to claim 1 including:
   (h) providing the responses of the respondent to a third party.

7. The method according to claim 1 including:
   (h) analyzing the responses entered by the respondent; and
   (i) providing results of the analysis to a third party.

8. The method according to claim 6 or 7 wherein the reporting is done electronically.

9. The method according to claim 8 wherein the reporting is automated.

10. The method according to claim 1 including:
    (h) providing a second database containing responses of previous respondents; and
    (i) storing the responses of the respondent in the second database such that the responses are associated with said respondent.

11. The method according to claim 10 including:
    (j) averaging the responses of the respondent and the previous respondents to each question; and
    (k) reporting to a third party.

12. The method according to claim 11 wherein the report includes the responses of the respondent and the averages.

13. The method according to claim 11 wherein the third party is a health care provider.

14. The method according to claim 1 wherein the questionnaire is a medically-related questionnaire.

15. The method according to claim 1 wherein the respondent is identified by an identification number, said identification number identifying the respondent and the questionnaire to be completed.

16. The method according to claim 1 including entering a questionnaire into the database by contacting the control unit and entering the questions and a range of responses by telephone.

17. The method according to claim 1 wherein the question is repeated if an invalid response is entered.

* * * * *